May 31, 1927.

C. BETHEL 1,630,370

BEARING

Filed Dec. 20, 1923

3 Sheets-Sheet 1

WITNESSES:
S. H. Volker
S. M. Pineles.

INVENTOR
Claude Bethel.
BY
Wesley G. Carr
ATTORNEY

May 31, 1927. 1,630,370
C. BETHEL
BEARING
Filed Dec. 20, 1923 3 Sheets-Sheet 3

WITNESSES:
J H Volker
S M Pineles

INVENTOR
Claude Bethel.
BY
Wesley G Carr
ATTORNEY

Patented May 31, 1927.

1,630,370

UNITED STATES PATENT OFFICE.

CLAUDE BETHEL, OF WILKINSBURG, PENNSYLVANIA, ASSIGNOR TO WESTINGHOUSE ELECTRIC & MANUFACTURING COMPANY, A CORPORATION OF PENNSYLVANIA.

BEARING.

Application filed December 20, 1923. Serial No. 681,750.

My invention relates to bearings and it has special relation to the lubrication of sleeve bearings for railway service.

In my co-pending application Ser. No. 672,707, filed November 5, 1923, and in the co-pending application of E. Tidlund and myself, Ser. No. 665,358, filed September 28, 1923, patented April 28, 1925, No. 1,535,560, both assigned to the Westinghouse Electric & Manufacturing Company, is described a sleeve bearing comprising a hermetically closed oil reservoir having an oil receptacle extending from, and communicating with, the lower portions of the reservoir from which oil is supplied to the bearing journal by means of a capillary feeding wick. In order to maintain a constant oil level in the oil receptacle, the oil reservoir has to be so closed as to preserve the vacuum which is necessary for holding the oil.

My present invention is directed towards the provision of means for injecting oil into the reservoir without disturbing the hermetical enclosure formed by the same.

Another object of my invention is to provide simple means for securing a proper level in the oil receptacle for feeding the oil to the bearing.

Figure 1:
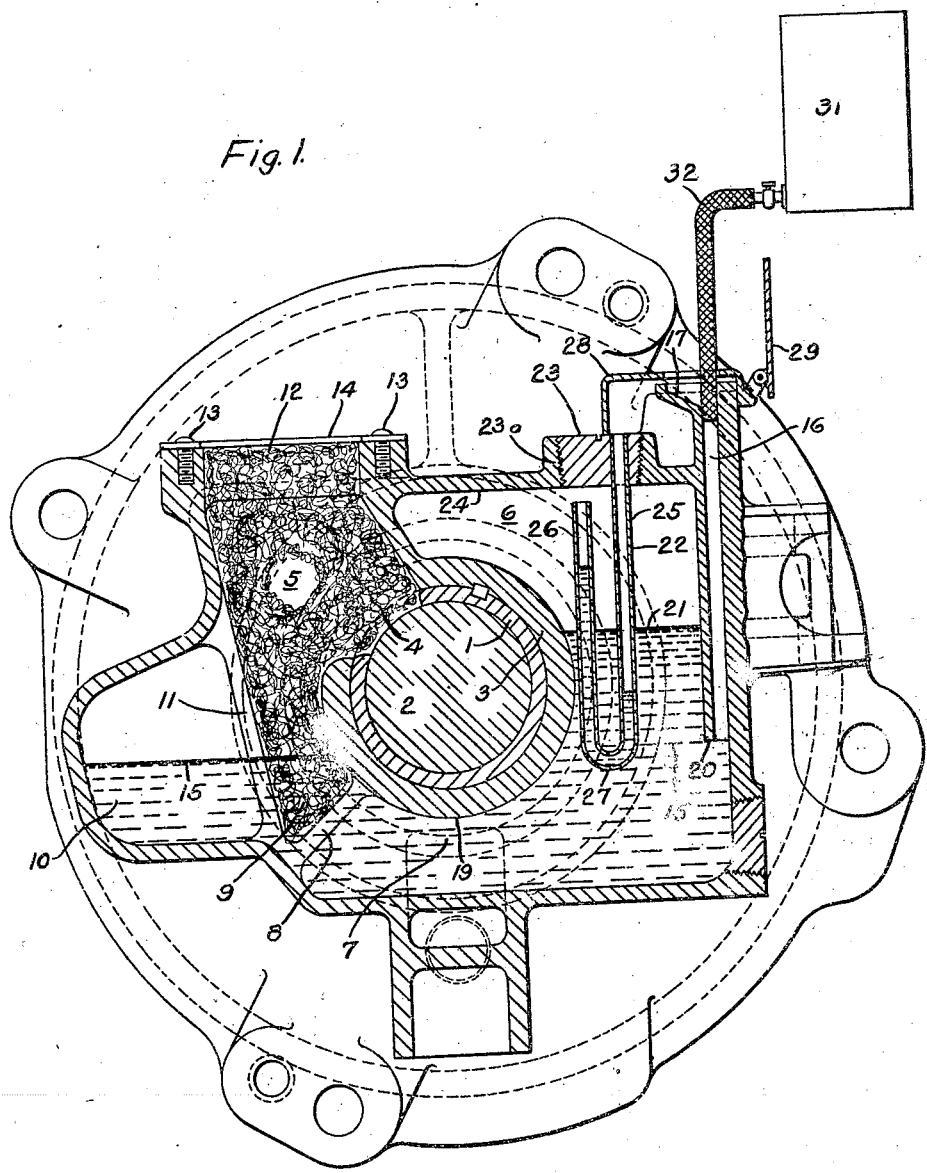
Figure 2:
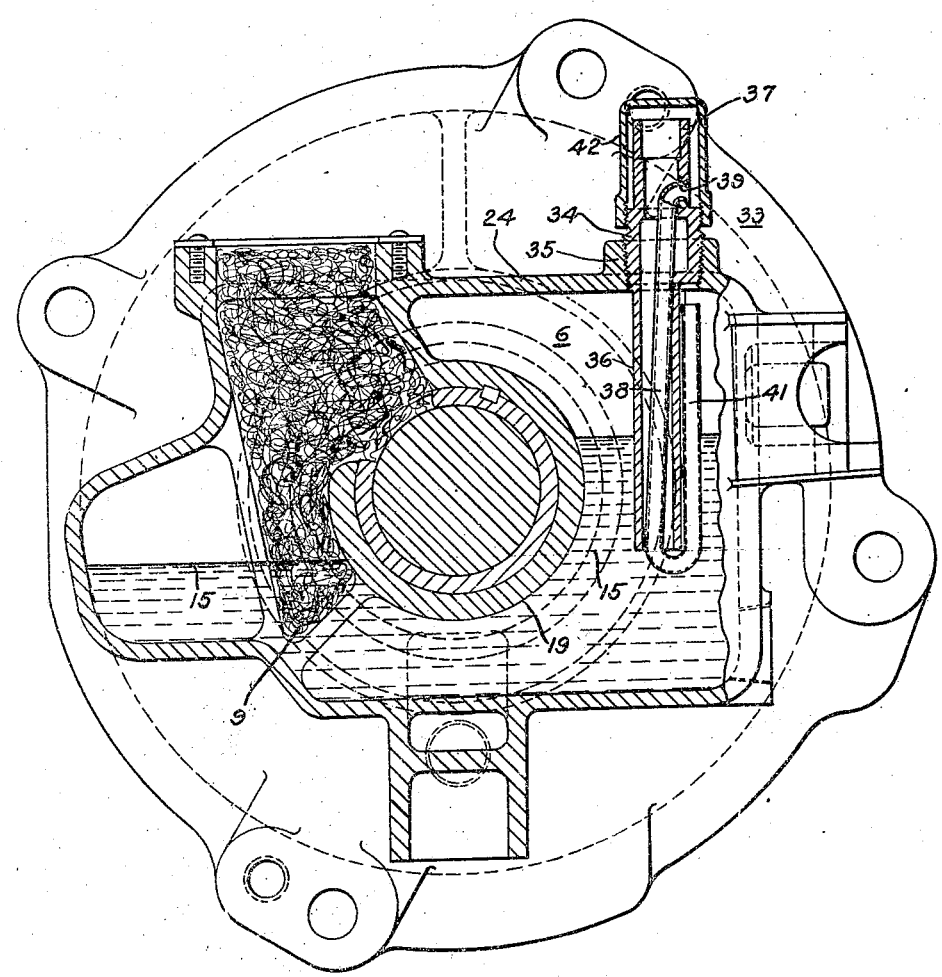
Figure 3:
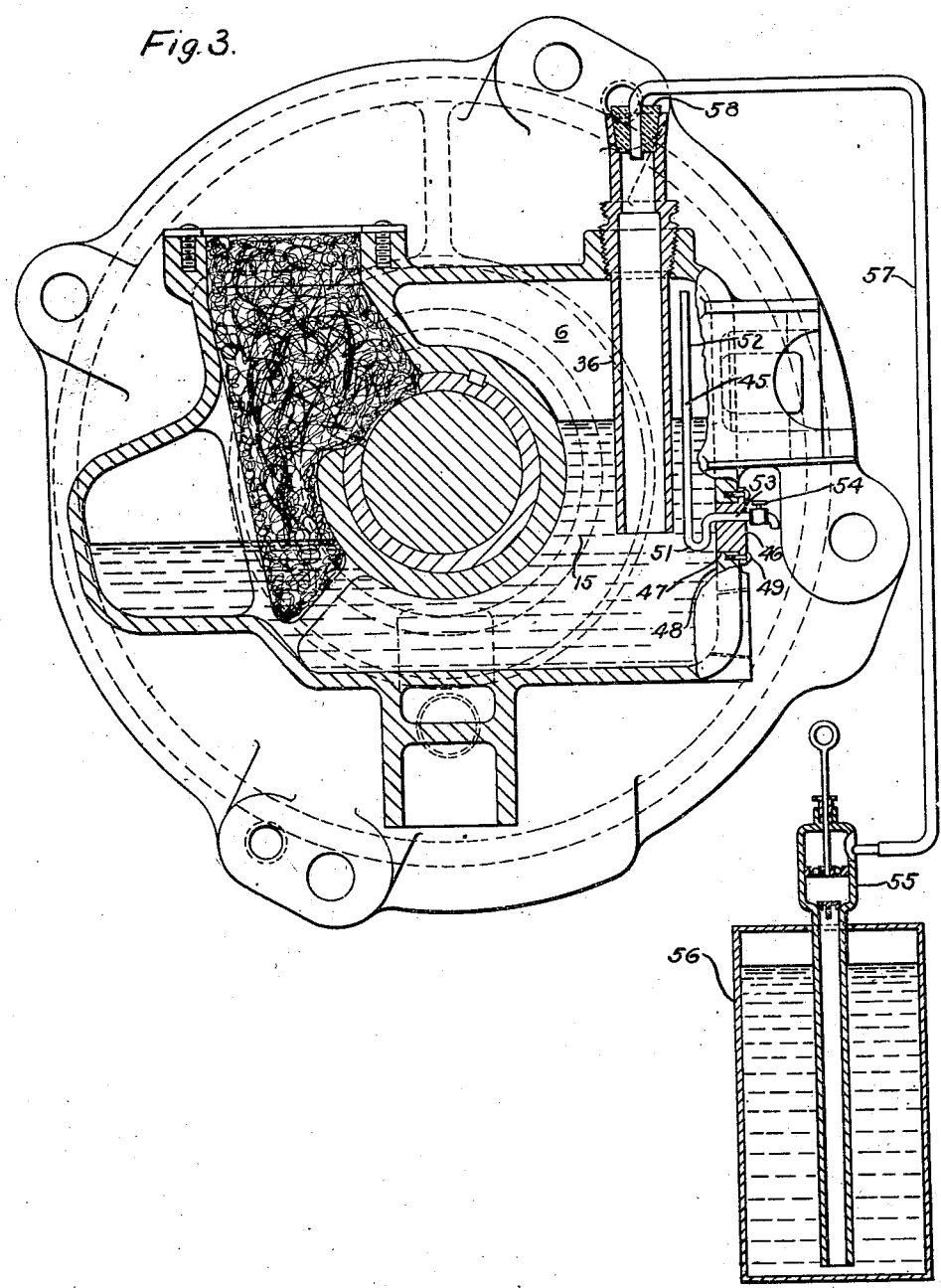

With the foregoing and other objects in view, my invention consists in the arrangements and details of construction described and claimed herein and illustrated in the accompanying drawing, wherein Figure 1 is a sectional view of a bearing made in accordance with my invention, Figs. 2 and 3 are similar views illustrating modifications of my invention.

In Fig. 1 is shown a bearing housing comprising a bearing sleeve 1 surrounding a journal 2 of a rotating machine. The bearing sleeve 1 is mounted in a bearing collar 3 which is cast integrally with the bearing housing, said collar having an opening 4 registering with a lubricating chamber 5 occupying one side of the bearing housing. The other side of the housing forms an oil reservoir 6 communicating, through a passage 7 under the bearing collar 3, to an oil-supply opening 8 in the lower portion of the lubricating chamber 5, said lower portion constituting an oil receptacle 9.

An oil expansion chamber 10 is disposed adjacent to the oil receptacle 9 and communicates therewith through a slot 11 for maintaining the same oil level as in the receptacle 9. The entire lubricating chamber 5, including the oil receptacle 9, is packed with waste 12 or other capillary oil feeding means which may be removed or renewed upon unscrewing the bolts 13 securing a cover 14 upon an opening in the upper portion of the lubricating chamber 5.

The oil is carried through the capillary channels in the waste 12 to the lubricating opening 4 and thence to the bearing journal 2. The amount of lubricant which is supplied to the journal 2 is determined by the total cross-sectional area of the capillary feeding means at the oil supply-level 15 of the oil receptacle, the lifting height of the capillary oil feeding means, i. e., the difference in the levels of the oil-supply opening 4 and the oil-supply level 15, and the viscosity and other properties of the lubricating oil, depending on the lubricating requirements of the journal.

An oil-filling channel 16 is provided in one of the walls of the oil reservoir. The channel has an enlarged mouth 17 at its upper portion disposed above the oil reservoir 6 and extends into the oil reservoir to the level 15 at which it is required to maintain the oil in the oil receptacle 9.

The significance of this arrangement may be understood by considering the conditions in the bearing in case the mouth 17 of the oil-filling channel 16 should be hermetically closed. Under such conditions, the oil level in the oil receptacle 9 would be determined of the highest level in the communicating passage 7, i. e., it would correspond to the level 19 of the lower portion of the bearing collar 3, since oil rising in the oil receptacle 9 above such level would seal the passage 7 and prevent the passage of air into the upper portion of the hermetically closed oil reservoir 6.

In my present invention, the mouth 17 of the oil-filling chamber 16 is not hermetically closed but provides free communication between the level 15 in the oil reservoir and the atmosphere. The static pressure at the height 15 in the oil reservoir is thus identical with the pressure at the lower edge 20 of the filling channel 16 and the oil in the two communicating vessels will thus rise to the same level.

A fall of the oil level in the oil receptacle will cause a small fall in the oil level at the lower edge 20 of the oil-filling channel until sufficient air bubbles have passed under the edge 20 into the upper portion of the oil reservoir to raise the oil-level to the height 15 of the edge 20 at which balanced conditions are again restored.

The pressure in the space above the oil level 21 in the oil reservoir will thus so adjust itself automatically that the oil head between the oil levels 15 and 21 plus the pressure in the space above the oil 21 is equal to the atmospheric pressure. By properly choosing the height of the lower opening of the oil-filling channel 16, I am thus able to control the height of the oil level in the oil receptacle 9 in accordance with operating requirements of the bearing.

The oil reservoir 6 is also provided with what may be termed a "vent-attachment" 22 for securing uniform pressure conditions in the oil reservoir and preventing any disturbance of the hermetical sealing of the same during the normal operation of the bearing. The "vent-attachment" comprises a threaded plug 23 which is hermetically secured into a hole 23ª in the upper wall 24 of the oil reservoir 6. A vent pipe of U-shape has a long arm 25 projecting through the plug 23 and terminating above the oil reservoir but well below the mouth 17 of the oil-filling passage, and a short arm 26 projecting up to a point near the upper wall 24 of the oil reservoir, the bent portion 27 of the vent pipe being disposed in the oil under the level 15 which is maintained in the oil receptacle 9. A cap 28 and a hinged cover 29 prevent dust from entering the open ends of the oil filling channel 16 and the long arm 25 of the vent pipe.

The operation of the "vent-attachment" 22 may be understood by considering the requirements and the conditions obtaining while filling the reservoir 6. I may, for instance, fill the reservoir 6 by unscrewing the plug 23 and pouring oil through the hole 23ª. Since the opening 8 leading from the communicating channel 7 to the oil receptacle 9 is to certain degree plugged by the capillary oil feeding means or waste disposed therein, the filling operation may be performed without causing an excessive rise of the oil level in the oil receptacle 9. After the oil reservoir is filled, the plug 23 must be so screwed into the hole 23ª as to secure a hermetical enclosure of the oil in the reservoir 6. The pressure condition in the oil reservoir 6 and the operation of the bearing will entirely depend upon the care which the person attending the bearing has exercised in closing the hole 23ª.

I have found that it is very desirable to make apparatus fool-proof, especially where the successful operation depends upon the maintenance of air-tight joints. It is one of the objects of the vent pipe to make the operation of a bearing of the above described character independent of the care of the attendant and to automatically maintain uniform pressure conditions during the entire operation. Let us assume that the vent pipe 22 has its arms 25 and 26 partially filled with oil and that the oil in the oil reservoir 6 has been used up until it has reached the level 15. Air then passes freely under the lower edge 20 of the oil-filling channel 16 into the upper portion of the oil reservoir 6. In refilling the reservoir 6, I pour oil into the mouth 17 of the oil-filling channel 16, the oil filling up the entire height of the channel 16. By reason of the pressure-head of the oil column in the channel 16, the oil will flow into the oil reservoir 6, compressing the air which is trapped in the space above the rising oil level 21, and displacing the oil in the short arm 26 of the vent pipe, forcing it out through the longer arm 25 until the oil has filled up the entire space in the oil reservoir, the remaining air being all expelled through the vent pipe 22, followed by the freshly filled oil until the latter spills over the open end of the longer arm 25 of the vent pipe.

The movement of oil through the filling channel 16 into the oil reservoir 6 takes place by reason of the pressure head of the oil column in the channel 16 and obviously this pressure head acts during the filling operation also upon the oil in the oil receptacle 9 tending to raise the oil level of the same, but is unable to do it by reason of the small oil-carrying capacity of the capillary oil-feeding means plugging the opening 8 leading thereto. After the filling operation has been performed and the oil has filled up the entire chamber 6, the oil columns in the oil-filling channel 16 and in the long arm 25 of the vent pipe exert a pressure upon the oil in the receptacle 9, and, in a relatively short time, the small quantity of oil constituting these two columns will slightly raise the level of the oil in the oil receptacle 9, until all of the levels are in balanced condition. The total rise of the oil-level in the oil receptacle 9 will be relatively small, however, on account of the large surface of the oil-level area in the expansion chamber 10. The consumption of the oil in the journal will soon cause the normal oil level 15 to be attained. The oil in the chamber 6 draws in sufficient oil from the short arm 26 of the vent pipe 22 to make the oil level in the longer arm 25 about the same as the level 15, when the chamber 6 is full, and thereafter the difference in level in the two arms of the U-shape tube adjusts itself in accordance with the air pressure in the chamber 6.

For convenience in filling and for other reasons explained more fully hereinafter, it may be desirable to employ an oil tank or barrel 31, supported above the reservoir 6, or any other source of oil-pressure, and having a flexible hose 32 making a substantially tight joint with the filling channel 16. In this way, the pressure-head of the filling column of liquid may be increased with a consequent speeding up of the filling operation, besides making it possible to fill the reservoir when the oil level therein is materially higher than the level 15.

In Fig. 2, I have shown a bearing construction which is similar to that illustrated in Fig. 1 and which combines the filling channel and the vent pipe in a single attachment 33 which comprises a plug 34 screwed into a hole 35 in the upper wall 24 of the oil reservoir 6 and forming a hermetical enclosure of the same. The plug 34 has a lower portion constituting a filling tube 36 extending down to the desired oil level 15 and having a mouth 37 at its upper end for receiving the oil. A vent pipe of U-shape is provided, having a long arm 38 which extends through the interior of the filling tube 36 and terminates in an end portion 39 communicating with the atmosphere and having a short arm 41 which extends upwardly almost to the upper wall 24 of the oil reservoir 6. A cap 42 covers the open ends of the filling tube and of the vent pipe for preventing dust from entering the same, and is so arranged as to maintain approximately the same pressure as the surrounding atmosphere.

The operation of the arrangement in Fig. 2 is identical to that shown in Fig. 1.

The length of the filling tube 36 may, of course, be extended to a point below the lower portion 19 of the bearing collar 3, in which case the attachment 34 serves only to permit the filling of oil into the bearing without disturbing the hermetical enclosure of the same. In such case, the operating oil level in the oil receptacle 9 would be determined by the lower edge 19 of the bearing collar 3.

In Fig. 3 is shown a modification of my invention wherein a vent pipe 45 is mounted upon a plate member 46 which is hermetically secured upon an opening 47 in a side wall 48 of the oil reservoir 6 by means of screws 49. The vent pipe 45 has a curved portion 51 which is disposed below the level of atmospheric pressure 15 in the oil reservoir 6 corresponding to the lower edge of the filling pipe 36 and two arms 52 and 53 extending, respectively, into the upper portion of the oil reservoir and the atmosphere. The arm 53 which leads to the atmosphere, extends, at least in portion, above the level 15 of atmospheric pressure in the reservoir 6 and is provided with a closing valve or cock 54.

It is evidently not necessary to make the vent-pipe arm 53 leading to the atmosphere much higher than the level 15 of atmospheric pressure in the oil reservoir 6 since the oil level in such arm is at the above height 15 shortly after the filling operation is at an end. With the consumption of oil in the bearing and the gradual fall of the oil in the reservoir 6 the gas pressure in the space above the oil in the reservoir is increasing and the oil that is trapped in the vent pipe 45 is slowly forced out through the pipe-arm 53 leading into the atmosphere. This process would not in any way affect the hermetical enclosure of the space within the reservoir. I prefer, however, to avoid the slow dripping of the oil from the open end of the pipe arm 53, and it is to this end that I provide the valve or cock 54 which is open during the filling operation and closed during the normal operation of the bearing. I do not depend on the cock or valve for maintaining the low pressure in the reservoir, the same being maintained by reason of the relative heights of the vent-pipe arms, since the gas-pressure in the oil reservoir 6 tends to actually force oil out from the reservoir through the vent pipe. The valve or cock is chiefly used to avoid the oil leaking out from the vent pipe.

I have found that the additional resistance against the inflow of oil into the reservoir which is caused through the provision of the vent pipe makes it desirable to provide means for speeding the filling operation so as to effect the same in a short time. To this end, I utilize means for injecting oil into the filling pipe under increased pressure and it is my desire that this combination shall be regarded as a distinct feature of my invention. For instance, I may provide a familiar type of suction-pressure pump 55 which is shown immersed in an oil container 56 and supplying oil to the filling pipe 36 through a hose 57. The connection between the hose and the upper end of the filling pipe is made pressure tight as by means of a rubber plug 58. In this way, I increase the pressure-head of the filling column, with a consequent acceleration of the filling operation besides making it possible to fill the reservoir at any level of the oil therein.

My invention is not limited to use in the particular type of bearing illustrated herein but is applicable wherever problems of the same nature are to be solved. Likewise, I do not wish to be limited to the particular means which I have used in achieving the objects of my invention as it will be obvious to those skilled in the art that the objects may be achieved in many other ways without departing from the spirit and scope of my invention. The various pipes and channels may, for instance, be arranged in a manner other than that indicated in the drawing. It is my desire that all such modifications be considered as covered by the appended claims.

I claim as my invention:

1. In a lubricating device, a hermetically closed oil reservoir, an oil receptacle extending upwardly from, and communicating with, an opening in the lower portion of said reservoir and a filling attachment secured to said oil reservoir for providing an open-topped channel communicating therewith and extending from a height at least as high as the highest oil level in said reservoir to a height corresponding to the oil level in said receptacle, for admitting air to said reservoir as the oil is used up, and a tube of U-shape having one arm projecting outside said channel and terminating in the upper portion of said reservoir and a second arm projecting through the inside of said channel and communicating with the atmosphere.

2. In a liquid-feeding device, a hermetically closed reservoir, a receptacle extending upwardly from, and communicating with, an opening in the lower portion of said reservoir, said reservoir having a hole in its upper portion, a filling attachment comprising an open-ended channel member having its outer wall hermetically sealed into said hole and extending down to a height corresponding to the liquid level in said receptacle, the construction being such that air is admitted to said reservoir from the bottom of said channel as the liquid is used up in said receptacle, and a tube of U-shape having one arm projecting outside said channel and terminating in the upper portion of said reservoir and a second arm projecting through the inside of said channel and communicating with the atmosphere.

3. In a lubricating device, a normally hermetically closed oil reservoir, having an opening in the lower portion thereof for filling the same, and means for normally maintaining the hermetic closure and for providing an exit, during the filling operation, to permit the escape of the air trapped in said reservoir above the oil level thereof without disturbing the hermetical enclosure normally formed by said means.

4. In a lubricating device, a hermetically closed oil reservoir, having an oil-supply opening in the lower portion thereof for supplying oil to the lubricated device, and filling means for injecting oil into said reservoir at a level below the normal oil level thereof and expelling the air trapped therein above said oil level without substantially affecting the hermetical enclosure formed by said reservoir under normal operating conditions.

5. In a lubricating device, a hermetically closed oil reservoir, an oil receptacle extending upwardly from, and communicating with, an oil-supply opening in the lower portion of said reservoir, filling means for injecting oil into said reservoir at a level below the normal oil level thereof, and means for providing a duct having one opening terminating in the upper portion of said oil reservoir and a second opening disposed outside said reservoir at a height above the lowest oil level in said reservoir and having a portion intermediate said openings disposed below the lowest oil level.

6. In a lubricating device, a hermetically closed oil reservoir, an oil receptacle extending upwardly from, and communicating with, an oil-supply opening in the lower portion of said reservoir, means for providing an oil-filling channel extending from a height above the highest oil level in said reservoir to a height corresponding to the oil level in said receptacle, and means for providing a duct having one opening terminating in the upper portion of said oil reservoir and a second opening disposed outside said reservoir at a height not lower than the lowest oil level and having a portion between said openings disposed below said oil level in the receptacle.

7. In a lubricating device, a hermetically closed oil reservoir having an oil-supply opening in the lower portion thereof and a tube of substantially U-shape having one arm terminating in the upper portion of said reservoir and a second arm terminating outside said reservoir, the bent portion of said tube being below the lowest oil level in said reservoir.

8. In a lubricating device, a hermetically closed oil reservoir having an oil-supply opening in the lower portion thereof, an oil-supply receptacle communicating with said opening, means for maintaining a predetermined oil level in said oil-supply receptacle, and a tube of substantially U-shape having one arm terminating in the upper portion of said reservoir and a second arm terminating outside said reservoir above said oil level, the bent portion of said tube being not higher than said oil level in the oil-supply receptacle.

9. In a lubricating device, a hermetically closed oil reservoir, an oil receptacle extending upwardly from, and communicating with, an oil-supply opening in the lower portion of said reservoir, said oil reservoir having a hole, an oil-filling attachment hermetically closing said hole and carrying a tube of substantially U-shape having one arm terminating in the upper portion of said reservoir and a second arm terminating outside said reservoir, the bent portion of said tube being immersed in the oil in said reservoir.

10. In a lubricating device, a hermetically closed oil reservoir, an oil receptacle extending upwardly from, and communicating with, an oil-supply opening in the lower portion of said reservoir, said oil reservoir having a hole in its upper portion, an oil-filling attachment hermetically closing said hole and provided with an oil-filling tube projecting through said hole into said oil reservoir and a tube of U-shape having one arm projecting outside said oil-filling tube and terminating in the upper portion of said reservoir and a second arm projecting through the inside of said oil-filling tube and communicating with the atmosphere at a point above said reservoir and below the top of said tube, whereby the column of oil in said filling tube during the filling operation provides a greater head than the column of oil that must be expelled from said tube in order to permit the entrapped air to escape from the reservoir.

11. In a lubricating device, a hermetically closed oil reservoir, an oil receptacle extending upwardly from, and communicating with, an oil-supply opening in the lower portion of said reservoir, means for providing an oil-filling channel extending from a height above the highest oil level in said reservoir to a height corresponding to the oil level in said receptacle, means for providing a duct having one opening terminating in the upper portion of said oil reservoir and a second opening disposed outside said reservoir at a height not lower than said lowest oil level and having a portion intermediate said openings disposed below said oil level in the receptacle, and means for filling oil under increased pressure into said filling channel having a flexible outlet tube which is detachably and tightly joinable with said oil-filling channel.

12. A hermetically closed vessel for holding a liquid, means for displacing liquid from said vessel by admitting a gaseous medium to the upper portion thereof and filling means for injecting liquid into said vessel at a level below the normal level of the liquid and expelling the gas trapped above said liquid without substantially disturbing the hermetical enclosure formed thereby.

13. In a lubricating device, a hermetically closed oil reservoir, an oil receptacle extending upwardly from, and communicating with, an oil-supply opening in the lower portion of said reservoir, means for providing a filling channel extending into said oil reservoir to a level below the normal oil-level thereof, and a vent pipe having an opening disposed in the upper portion of said oil reservoir and having a portion disposed below said opening, said vent-pipe being arranged to permit the escape of the air trapped in the upper portion of said reservoir during the filling operation and being, at least partially, filled with oil during the normal operation of said device.

14. In a lubricating device, a hermetically closed oil reservoir, an oil receptacle extending upwardly from, and communicating with, an oil supply opening in the lower portion of said reservoir, means for providing a filling channel extending into said oil reservoir to a level below the normal oil-level thereof, a vent pipe having an opening disposed in the upper portion of said oil reservoir and having a portion disposed below said opening, said vent-pipe being arranged to permit the escape of the air trapped in the upper portion of said reservoir during the filling operation and being, at least partially, filled with oil during the normal operation of said device and means for injecting oil through said filling channel into said reservoir under pressure.

15. In a lubricating device, a hermetically closed oil reservoir, an oil receptacle extending upwardly from, and communicating with, an oil-supply opening in the lower portion of said reservoir, means for providing a filling channel extending into said oil reservoir to a level below the normal oil-level thereof, a vent pipe having an opening disposed in the upper portion of said oil reservoir and having a portion disposed below said opening, said vent pipe being arranged to permit the escape of the air trapped in the upper portion of said reservior during the filling operation and being at least partially, filled with oil during the normal operation of said device, said channel and said vent-pipe constituting a relatively high resistance for the inflow of oil into said reservoir during the filling operation, and pressure creating means for injecting oil into said reservoir under increased pressure.

16. A lubricating device comprising a hermetically closed oil reservoir, an oil receptacle extending upwardly from, and communicating with, an oil-supply opening in the lower portion of said reservoir, an oil-containing vent-pipe extending between the upper portion of said reservoir and the atmosphere, and normally maintaining said hermetic closure and means for injecting oil into said reservoir at a level below the normal level thereof, whereby the air trapped in the upper portion of said vessel expels the oil contained in said vent pipe and escapes therethrough, and, upon continuance of the injecting operation, the injected oil finally reaches said vent-pipe and is again entrapped therein.

17. In a lubricating device, a hermetically closed oil reservoir, an oil receptacle extending upwardly from, and communicating with, an oil-supply opening in the lower portion of said reservoir, means for providing a filling channel extending into said oil reservoir to a level below the normal oil-level thereof, and a vent pipe having an opening disposed in the upper portion of said oil reservoir and having a portion disposed below said opening, said vent-pipe being arranged to permit the escape of the air trapped in the upper portion of said reservoir during the filling operation and being, at least partially, filled with oil during the normal operation of said device and a valve means in said vent pipe intermediate the ends thereof.

18. The combination with a bearing, of means for lubricating said bearing comprising a hermetically closed oil reservoir, an oil receptacle communicating with the lower portion of said reservoir, means associated with said oil receptacle for conveying oil to said bearing, means for injecting oil into said reservoir under the oil level therein, for filling purposes, and oil-trap means automatically operable to permit the egress of entrapped air from said reservoir during the filling operation and to seal itself against the ingress of air after the conclusion of the filling operation.

19. In a liquid-dispensing device, a hermetically closed reservoir, a receptacle communicating with the lower portion of said reservoir, means for injecting liquid into said reservoir under the liquid level therein, for filling purposes, and liquid-trap means automatically operable to permit the egress of entrapped air from said reservoir during the filling operation and to seal itself against the ingress of air after the conclusion of the filling operation.

In testimony whereof, I have hereunto subscribed my name this 5th day of December 1923.

CLAUDE BETHEL.